United States Patent
Mikijelj

(10) Patent No.: US 7,964,296 B2
(45) Date of Patent: *Jun. 21, 2011

(54) HIGH-VOLUME, FULLY DENSE SILICON NITRIDE MONOLITH AND METHOD OF MAKING BY SIMULTANEOUSLY JOINING AND HOT PRESSING A PLURALITY OF RBSN PARTS

(75) Inventor: Biljana Mikijelj, Cerritos, CA (US)

(73) Assignee: Ceradyne, Inc., Costa Mesa, CA (US)

( * ) Notice: Subject to any disclaimer, the term of this patent is extended or adjusted under 35 U.S.C. 154(b) by 626 days.

This patent is subject to a terminal disclaimer.

(21) Appl. No.: 11/881,510

(22) Filed: Jul. 27, 2007

(65) Prior Publication Data

US 2009/0029843 A1  Jan. 29, 2009

(51) Int. Cl.
*C04B 35/587* (2006.01)
*C04B 37/00* (2006.01)
(52) U.S. Cl. ........ 428/698; 428/446; 428/448; 428/447; 428/451; 428/452; 501/97.1; 501/97.2; 501/97.3
(58) Field of Classification Search .................. None
See application file for complete search history.

(56) References Cited

U.S. PATENT DOCUMENTS

| | | | |
|---|---|---|---|
| 3,854,189 A | 12/1974 | Ezis et al. | |
| 4,172,107 A | 10/1979 | Nakamura et al. | |
| 4,477,402 A * | 10/1984 | Ezis | 264/607 |
| 4,848,984 A * | 7/1989 | Ezis et al. | 51/309 |
| 4,946,630 A * | 8/1990 | Ezis | 264/82 |
| 5,302,328 A * | 4/1994 | Ezis | 156/89.27 |
| 2006/0014624 A1* | 1/2006 | Mikijelj | 501/97.2 |

OTHER PUBLICATIONS

Densification of Reaction-Bonded Silicon Nitride, John A. Mangels and Gerald J. Tennenhouse, Ceramic Bulletin, vol. 59, No. 12 (1980), pp. 1216-1222.

High Strength Hot-Pressed Si3N4 With Concurrent Y2O3 and A12O3 Additions, Akihiko Tsuge and Katsutoshi Nishida, Ceramic Bulletin, vol. 57, No. 4 (1978), pp. 424-431.

Joining of Non-Oxide Ceramics for High-Temperature Applications, Carl H. Bates, Michael R. Foley, Giulio A. Rossi, Glenn J. Sundberg and Francisco J. Wu, Ceramic Bulletin, vol. 69, No. 3 (1990), pp. 350-356.

Joining of Silicon Nitride Ceramics by Hot Pressing, Mamoru Nakamura, Katsushi Kubo, Shuzo Kanzaki, Hideyo Tabata, Journal of Materials Science 22 (1987), pp. 1259-1264.

Joining of Turbine Engine Ceramics, M.U. Goodyear and A. Ezis, Advances in Joining Technologies, edited by J.J. Burke et al, Brook Hill Publ., Chestnut Hill, MA (1976), pp. 113-153.

Post Hot Pressing of Reaction Bonded Silicon Nitride, E. Gugel and H. Kessel, Ceramics for High Performance Applications II, edited by J.J. Burke et al, Brook Hill Publ., Chestnut Hill, MA (1978), pp. 515-526.

* cited by examiner

*Primary Examiner* — Timothy M Speer
*Assistant Examiner* — Vera Katz
(74) *Attorney, Agent, or Firm* — Leonard Tachner

(57) ABSTRACT

High-volume, fully dense, multi-component monoliths with microstructurally indistinguishable joints that can be used as refractory, corrosion and wear resistant components in the non-ferrous metal industry. The $Si_3N_4$ monoliths according to the invention comprise at least 90% by weight β-type $Si_3N_4$ and up to 10% by weight of a predominantly amorphous binder phase, said binder phase being formed from compositions of the rare earth metal —Al—Si—O—N, rare earth metal —Mg—Si—O—N or Mg—Si—O—N systems. Preferably the rare earth metal is yttrium (Y). The monoliths have a volume of greater than 250 $cm^3$. A method of making the multi-component monoliths is achieved by simultaneously joining and uniaxially hot pressing an assembly of reaction bonded silicon nitride bodies (RBSN bodies). RBSN bodies are placed in contact with each other in the substantial absence of any interlayer or ceramic paste in between.

5 Claims, 4 Drawing Sheets

HIGH-VOLUME, FULLY DENSE SILICON NITRIDE MONOLITH AND METHOD OF MAKING BY SIMULTANEOUSLY JOINING AND HOT PRESSING A PLURALITY OF RBSN PARTS

BACKGROUND OF THE INVENTION

1. Field of the Invention

The present invention relates to high-volume, fully dense, multi-component silicon nitride monoliths with improved properties, and to a method of making same.

2. Background Art

The unique properties of silicon nitride ceramics have made them attractive not only for use as cutting tools, engine components, ball bearings, wear parts, but also for pump parts and riser tubes. The extremely good thermal shock resistance against non-ferrous melts predestines dense silicon nitride also for use in non-ferrous metallurgy where in many cases high-volume, large-sized components of high reliability are required.

The production costs are a main problem in the application of silicon nitride ceramics. This is connected on the one hand with the high costs of raw material (submicron particle sized $Si_3N_4$ powder) and on the other hand with the component manufacturing technologies. Thus, if a large ceramic $Si_3N_4$ body is directly sintered or hot pressed in conventional fashion there will be a tendency for the body to display a large variation in sintered density and strength. In many instances it is impractical to fabricate large sized components in one piece and individual parts cannot be assembled and held together by mechanical means alone. There is, therefore, a considerable need for economical, non-mechanical methods to join $Si_3N_4$ ceramics.

Joining methods for $Si_3N_4$ ceramics can be grouped into the following categories: (i) solid state bonding with and without interlayers, (ii) direct joining of liquid phase sintered or hot pressed materials via hot pressing, (iii) bonding by liquid wetting and capillarity (pressureless, with for example silicate or oxynitride glasses or metal brazes), and (iv) joining by ceramic processing techniques. Nakamura et al., ["Joining of Silicon Nitride Ceramics by Hot Pressing", J. Mat. Sci. 22 (1987), 1259-1264] investigated joining of dense, hot pressed $Si_3N_4$ ceramics containing alumina and yttria as densification aids. Uniaxial pressure was applied at high temperature during the joining process. A polyethylene sheet of thickness 40 µm was used as a joining agent between the polished specimen surfaces to be joined. The joint strength was measured by four-point bend tests using test bars cut from joined HPSN couples perpendicular to the joining interfaces. The joint strengths increased with increases in joining temperature, joining pressure and holding time. The highest joint strength obtained was 567 MPa, which was about half the value of the mean strength of the original body. The formation of porous interfacial zones at the joints was considered to cause the reduction of the joint strength.

Especially the use of glass and metal interlayers may not produce seamless bonds because of the potential mismatch of the thermal expansion coefficients between the interlayer and the silicon nitride. In most cases the bond is neither as refractory nor as resistant to oxidation and corrosion attack as the base materials joined, i.e. joining seams exist, the joints being the performance limiting "weak links" in the multicomponent monolith. Moreover the categories of joining methods (i)-(iii) have the certain disadvantages (a) high cost for the required dense silicon nitride parts, (b) the long time required to grind and polish the individual parts to be joined at their joining surfaces, (c) proper alignment of parts is difficult to achieve, and (d) individual parts frequently fracture or deform while being joined.

On the other hand, method (iv), joining by ceramic processing techniques, seems capable of solving problems of weak joint strength and may produce excellent joints if properly performed.

State of the art in joining via ceramic processing techniques uses powder hot pressing or hot pressing of previously molded bodies to simultaneously densify and join ceramic parts. The initial work has focused on attaching components of dissimilar silicon nitride materials. According to the method which is disclosed in U.S. Pat. No. 3,854,189 to Ezis et al., a duodensity $Si_3N_4$ turbine rotor can be fabricated by hot-press bonding a reaction bonded $Si_3N_4$ (RBSN) blade ring to a previously hot pressed $Si_3N_4$ rotor hub. This process was later improved by simultaneously densifying the hot pressed $Si_3N_4$ rotor hub and bonding it to the RBSN blade ring, i.e. a predetermined amount of $Si_3N_4$ powder with a MgO additive was placed in the hub cavity and hot pressed to theoretical density while simultaneously bonding to the RBSN blade ring [Goodyear and Ezis: "Joining of Turbine Engine Ceramics", pp. 113-153 in Advances in Joining Technologies, edited by J. J. Burke et al., Brook Hill Publ., Chestnut Hill, Mass., 1976]. In a similar way Gugel and Kessel ["Post Hot Pressing of Reaction Bonded Silicon Nitride", pp. 515-526 in Ceramics for High Performance Applications II, edited by J. J. Burke et al., Brook Hill Publ., Chestnut Hill, Mass., 1978] have successfully fabricated a duodensity $Si_3N_4$ turbine rotor by simultaneously densifying a preformed RBSN hub and bonding it to a RBSN blade ring. However, the properties of the hot pressed to reaction bonded $Si_3N_4$ joints are limited by the inferior mechanical properties of the reaction bonded $Si_3N_4$.

Some success has been reported by Bates et al., ["Joining of Non-Oxide Ceramics for High Temperature Applications", Am. Ceram. Soc. Bull. 3 (1990), 350-6] on joining of $Si_3N_4$ with itself using hot isostatic pressing (HIP) as the ceramic processing technique. In this case the parts to be joined were green compacts obtained by cold isostatic pressing of sinterable $Si_3N_4$ powder containing 4% by weight yttria ($Y_2O_3$). Three joining conditions were evaluated: self-bonded without filler material, and two cases where a filler material consisting of $Si_3N_4$ containing 4% by weight $Y_2O_3$ was used. Joining and simultaneous densification was accomplished by glass encapsulation HIP to 100% of theoretical density (100% TD). Microfocus X-ray radiography did not detect porosity or glass pockets at the joint. However, despite the use of a high pressure HIP-densification process, a significant drop in the average strength of self-bonded and interlayer-bonded $Si_3N_4$ parts was experienced relative to control (unjoined) HIPed $Si_3N_4$ parts.

The possibility to join partially sintered and devitrified $Si_3N_4$ bodies by ceramic processing techniques into an integral unit having a complex shape, a density higher than 98% of the theoretical and high joint strength at 1200° C. (>50 kp/mm$^2$) was demonstrated in U.S. Pat. No. 4,172,107 to Nakamura et al. The basis of the method is pseudo-isostatically hot pressing (at 1780° C. with a relatively high pressure in the range of 350-450 bar and use of a pressure transmitting powder bed) an assembly of partially sintered and devitrified $Si_3N_4$ parts whereby densification and joining is simultaneously affected. The partially sintered $Si_3N_4$ bodies to be used by the process have a density of preferably 70-75% TD and are made from compacts of submicron $Si_3N_4$ powder with an admixture of yttria and alumina by heating at 1700-1750° C. in an aluminium nitride (AlN) powder bed for 90-250 mins. As can be seen from column 4, lines 15-22 of U.S. Pat. No. 4,172,107, the AlN powder bed induces crystallization of the amorphous binder phase whereby improved high temperature strength of the final composite structure and consequently its use as a turbine rotor is affected.

It has been reported from Tsuge et al. ["High Strength Hot Pressed $Si_3N_4$ With Concurrent $Y_2O_3$ and $Al_2O_3$ Additions", Am. Ceram. Soc. Bull., 57 (1978), 424-431], in relation to this high-temperature presintering step, that for $Si_3N_4$ compositions containing $5Y_2O_3$-$2Al_2O_3$ (wt %) the preheating of compacts embedded in AlN powder at 1750° C. brings about devitrification of the glassy grain boundary phase i.e. leads to crystalline $Si_3N_4$.$Y_2O_3$ as the dominant grain boundary phase in the hot pressed $Si_3N_4$ bodies.

However, owing to the high raw material and process costs the joining method according to U.S. Pat. No. 4,172,107 is economically and technologically disadvantageous and is as yet unsuitable for mass production of large hot pressed $Si_3N_4$ monoliths.

The present invention differs from the teachings of U.S. Pat. No. 4,172,107 relating to (1) a low-pressure hot pressing densification of an assembly of low cost RBSN bodies without use of a pseudo-isostatic pressure transmitting medium, and (2) a hot pressed $Si_3N_4$ monolith containing a predominantly amorphous oxynitride or silicate glass as main component of the binder (grain boundary) phase, and having a combination of unique mechanical properties both in the joint areas and in the bulk of the material.

SUMMARY OF THE INVENTION

It is one object of the invention to make available high-volume, fully dense, multi-component monoliths with microstructurally indistinguishable joints that can be used as refractory, corrosion and wear resistant components in the non-ferrous metal industry. The $Si_3N_4$ monoliths according to the invention comprise at least 90% by weight β-type $Si_3N_4$ and up to 10% by weight of a predominantly amorphous binder phase, said binder phase being formed from compositions of the rare earth metal —Al—Si—O—N, rare earth metal —Mg—Si—O—N or Mg—Si—O—N systems. Preferably the rare earth metal is yttrium (Y). The monoliths have a volume of greater than 250 $cm^3$ and the following properties both at the joints and in the bulk or matrix material:

a) bulk density of at least 99.5% of theoretical density (% TD);
  b) fracture toughness of at least 4.5 MPa·$m^{1/2}$;
  c) Vickers hardness (HV-5) greater than 1450 kg/$mm^2$;
  d) Elastic modulus of at least 310 GPa; and
  e) Four-point flexural strength of at least 700 MPa.

It is another object of the present invention to provide a method of making the above described multi-component monoliths, which can solve conventional drawbacks of high manufacturing costs and enables the easy manufacturing of large-sized $Si_3N_4$ components with a high yield. This object is achieved by simultaneously joining and uniaxially hot pressing an assembly of reaction bonded silicon nitride bodies (RBSN bodies). To form an assembly according to a predetermined shape the surfaces of individual RBSN bodies are placed in contact with each other in the substantial absence of any interlayer or ceramic paste in between. The RBSN bodies according to the invention have a bulk density of 45-75% TD, and consist of a mixture of α-$Si_3N_4$ and β-$Si_3N_4$ phases, remainder a densification aid. In one embodiment of the method of the invention said densification aid is a magnesium silicate or magnesium oxide in an amount of between 0.5 and 2% by weight. In another embodiment said densification aid is a mixture of yttria ($Y_2O_3$) with alumina ($Al_2O_3$), a Y-aluminate (e.g. YAG=$Y_3Al_5O_{12}$) a mixture of YAG with aluminum nitride (AlN) or alumina in an amount of 1-9% by weight. The joining step is carried out at a temperature of between 1700 to 1900° C. and using die pressures of below 2000 psi.

The joining step of the present invention also includes the following interrelated objects, aspects and features:

(1) In a first embodiment of joining, horizontal bonding of a plurality of bodies, which are placed on top of each other to form a large prismatic or cylindrical block, or a long prismatic or cylindrical tube, is provided.

(2) In a second embodiment of joining, lateral (vertical) bonding of two or more bodies, which are placed side by side to form a large plate, or a ring is provided.

(3) In a further embodiment of joining, both horizontal and vertical bonding of a plurality of bodies are provided, whereby a number is placed on top of each other and the remainder side by side.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which:

FIG. 2, comprising FIG. 2A shows a polished microstructure of the joint region; FIG. 2B shows a polished and plasma-etched microstructure in the same area: darker phase are β-$Si_3N_4$ needle-like grains (or so-called β-SiAlON); lighter phase is a predominantly glassy binder phase;

DETAILED DESCRIPTION OF PREFERRED EMBODIMENTS

Making of RBSN Preforms

Figure 1:
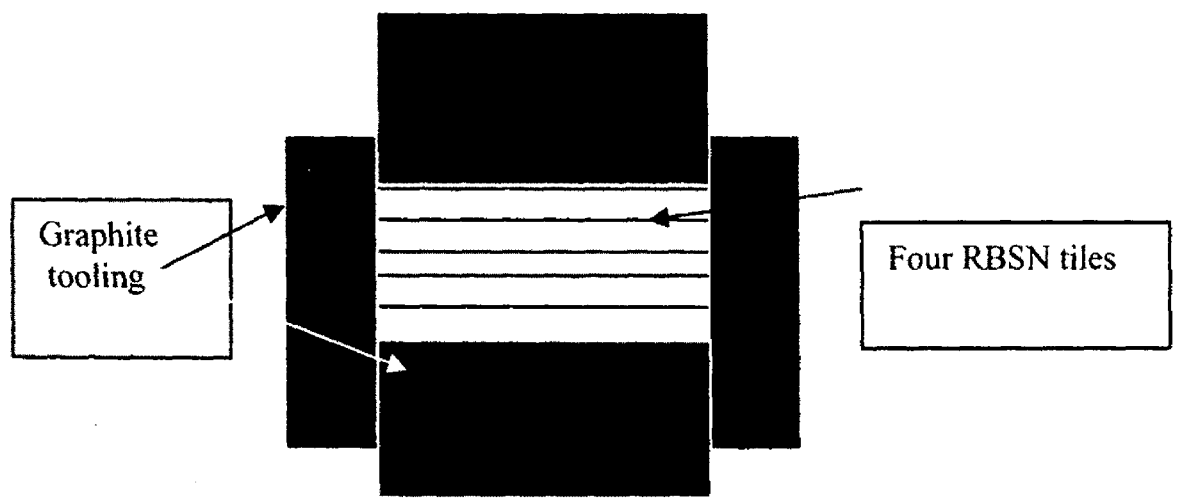
FIG. 1 is a cross sectional view of a four tile assembly made up by identical RBSN tiles (identical chemical composition, identical density and identical dimensions) which are stacked vertically to perform vertical bonding whereby joining planes are perpendicular to the pressing direction.

Fabrication of reaction-bonded silicon nitride (RBSN) preforms according to the invention is achieved by placing compacts of a mixture of silicon powder (with $SiO_2$ as an oxide film on its surface), and up to not more than 10% by weight of a densification aid in a nitridation furnace. The densification aid can be advantageously selected from the group consisting of magnesium silicate ($MgSiO_3$ or $Mg_2SiO_4$), magnesium oxide, a member (one or more) of the group of rare earth oxides or rare earth aluminates, aluminium nitride and aluminium oxide or a mixture thereof. In the context of the invention rare earth (RE) is to be understood as meaning the metals Sc, Y, La and the lanthanides. Preferably, rare earth metal is Y. Preferably, the densification aid used is magnesium silicate or magnesium oxide and a mixture of aluminium oxide ($Al_2O_3$) with yttrium oxide ($Y_2O_3$), the proportion of aluminium oxide in the mixture with yttrium oxide corresponding to at least 25% by weight of aluminium oxide. Use of the densification aid will provide liquid phase sintering during the final joining and hot pressing step. The silicon powder used is selected to have 99% or greater metal-based purity, with a maximum of 0.5% by weight Fe impurity, a maximum particle size of 20 μm with a specific surface area of about 2 $m^2$/g.

The densification aid is advantageously used in powder form as grain fractions 3 μm and finer, with specific surface areas in the range of 6 to 12 $m^2$/g.

To produce the compacts or green bodies, the Si powder together with the densification aids and small additions of pressing aids is preferably processed in a suitable way, for example by spray drying of the previously produced slip, to form free-flowing granules. The shaping of the spray dried granules to form compacts can be carried out by customary known measures, for example by die pressing or isostatic pressing at room temperature, a pressure of 500-2500 bar generally being employed. The pressing aids are removed from the pre-shaped green bodies before the nitridation step in an inert gas atmosphere or in air at temperatures up to 500° C. The green bodies from which the pressing aids have been removed are then nitrided in a nitrogen mass flow controlled furnace whereby the temperature is increased to a nitriding temperature of 1100 to 1400° C. at a slow rate, yielding RBSN bodies with a mixture of $\alpha$-$Si_3N_4$ and $\beta$-$Si_3N_4$ crystal structures, and bulk densities of 45-75% TD, preferably 60-70% TD. The nitrogen mass flow controlled cycle controls the exotherm and avoids localized melting of silicon. The nitriding yield of all the RBSN bodies is approximately 99%. Reaction bonded silicon nitride (RBSN) has the great advantage of net shape fabrication since it undergoes essentially no dimensional change during the nitridation process.

Alternatively, the densification aid may be introduced to undoped RBSN bodies by liquid infiltration using salt solutions, see Mangels et al. ["Densification of Reaction Bonded Silicon Nitride", Am. Ceram. Soc. Bull., 59 (1980), 1216-1222].

Making an Assembly of RBSN Bodies

If necessary, prior to mechanically assembling, the individual RBSN bodies are machined to provide the predetermined dimensions and smooth and flat surfaces. The machined surfaces are then cleaned to remove any dust particles, grease and any other contaminants. This may be performed by using any conventional solvents, as known in the art. To form an assembly according to a predetermined shape, the surfaces of the individual RBSN bodies are placed in contact with each other in the substantial absence of any interlayer or ceramic paste in between, e.g. to form a large prismatic block machined RBSN tiles having close to identical dimensions are stacked on top of each other, as shown in FIG. 1.

Then the assembly is placed into a graphite die permitting close fitting of the assembly to the graphite wall by use of graphite support bodies. Where multiple assemblies will be placed into the die simultaneously, graphite spacers are placed between each separate assembly. The graphite die, graphite support bodies and graphite die plungers can then be coated with a thin boron nitride layer to prevent reaction of the RBSN bodies with graphite during the following hot pressing procedure.

Joining and Densification

The graphite die with the assembly or assemblies therein and die plungers are then placed in a uniaxial hot press with a nitrogen atmosphere. Subsequently a hot pressing procedure is conducted whereby the assembled RBSN bodies are simultaneously joined and fully densified to form a silicon nitride monolith with indistinguishable joints and required dimensions, respectively. During hot pressing full densification is achieved via a liquid phase mechanism, i.e. the densification aid forms a RE—Al—Si—O—N, RE-Mg—Si—O—N or Mg—Si—O—N liquid. Silicon nitride grains dissolve in the liquid and precipitate as elongated β-type silicon nitride crystals (β-SiAlON). The liquid present on the joining surfaces during hot pressing also provides a seamless bonding of the adjacent parts of the assembly. During cooling of the dense, joined monolith, the liquid solidifies forming a predominantly vitreous binder phase between the elongated β-type $Si_3N_4$ crystals and in the multiple grain junctions. X-ray diffraction analysis of specimens taken from the monolith typically revealed only β-type $Si_3N_4$ crystalline phases.

The hot pressing procedure includes the following steps:
a) A uniaxial pressure of 0.69 MPa (100 psi) is applied to the end plungers at room temperature (RT);
b) The temperature is increased from RT to about 1600° C. and the pressure simultaneously increased to 6.9 MPa (1000 psi) (1 psi=6.9 kPa);
c) The temperature is increased to about 1750-1850° C. while applying additional pressure increase for a total of about 1750 psi;
d) Maintaining the temperature at 1750° C. and the pressure of 1750 psi for 0.25-2.0 hours, and thereafter;
e) The furnace is turned off, the pressure is released and the monolith is permitted to cool.

The thickness of the dense, hot pressed monolith, $L_{HP}$, can be computed from the vertical compaction ratio, CR, according to the following equations:

$$CR = \rho_{HP}/\rho_{RB} = L_{RB}/L_{HP}$$

$$L_{HP} = L_{RB}/CR$$

$\rho_{HP}$—bulk density of hot pressed monolith
$\rho_{RB}$—bulk density of RBSN preforms
$L_{RB}$—thickness of RBSN performs
$L_{HP}$—thickness of the dense hot-pressed and bonded monolith
CR—amount of vertical compaction necessary to go from the preforms to the dense, hot pressed monolith The compaction ratio of hot pressing according to the present invention is in the range of 1.3:1 to 1.8:1, preferably near 1.4:1 to 1.5:1, and the seamless silicon nitride monolith has a density in the range of 99.0 to 100% TD.

Seamless monolith means that joints at the initial preform interfaces are essentially indistinguishable from the rest of the part as determined by microscopic inspection using polished ground sections cut across the initial boundary interface.

The joints are then evaluated in terms of fracture toughness, as well as strength, elastic modulus, hardness and porosity, and such an evaluation offers the possibility of determining whether the material properties or processing defects act to limit the joint strength.

The $Si_3N_4$ monolith of the present invention demonstrates a high degree of reliability, i.e. a minimum of flaws and a uniformity of material and mechanical properties, the join areas having identical material properties and mechanical behavior as the matrix material. The $Si_3N_4$ monolith produced according to the invention has a volume of greater than 250 cm³ and is characterized by the combination of the following properties:

a) Bulk density of at least 99.0% of theoretical;
b) High fracture toughness of at least 4.5 MPa·m$^{1/2}$, according to the indentation crack length method;
c) High hardness demonstrated by HV-5 values of greater than 1450 kg/mm²;
d) Elastic modulus of at least 310 Gpa;
e) High four-point flexural strength of at least 700 MPa, with Weibull-modulus of at least 14.

The $Si_3N_4$ monolith has, in addition, a microstructure composed of large, elongated β-type $Si_3N_4$ grains and a predominantly vitreous binder phase in the multiple grain junctions between the elongated β-type Si3N4 crystals and in the grain boundaries. The binder phase and the $Si_3N_4$ grains in the joint regions have the same morphology and size as those in the matrix material.

The $Si_3N_4$ monoliths according to the invention can be used for a wide range of applications. For example, they can be used as refractory, corrosion and wear resistant components in plants and furnaces operated by the non-ferrous industry. The $Si_3N_4$ monoliths of the present invention are suitable in particular in aluminium metallurgy as large-sized linings e.g. for aluminium electrolytic cells.

The invention is further clarified by the following examples:

Testing Procedures

The densities were determined by water immersion technique. The relative density, in % TD, is based on the theoretical density of the $Si_3N_4$ hot pressed monolith.

To determine the fracture toughness of the $Si_3N_4$ monolith the Vickers indentation crack length method or Chevron Notch bars were used.

Vickers hardness HV-5, was measured by indentation with a Vickers diamond at a load of 5 kg (5-10 values per sample). The elastic modulus was measured using the ultrasound speed method.

The flexural tests were conducted on 3×4×50 mm test bars with surfaces ground according to ASTM C1161 (Method B). Flexural strength values (4-pt) were typical mean values of 10 measurements. For microstructure characterization of joints, samples were polished and inspected using optical and scanning electron microscopy techniques. The sections were prepared such that the observable region included the joint and the matrix of the joined bodies. Plasma-etching was used as an additional microstructure analysis to allow observation of the $Si_3N_4$ grain structure and the binder phase distribution.

Example 1

Elemental silicon (Si), $Y_2O_3$, $Al_2O_3$ powders were mixed in a slurry with appropriate binders, and the slurry was spray dried to form a flowable and pressable powder. The individual powders had the following specific surface areas: Si—2 m²/g, $Y_2O_3$—8 m²/g and $Al_2O_3$—10 m²/g. The maximum particle size of the Si powder was 20 μm and Si powder purity was ~99% with 0.3% by weight Fe content. The powder composition was calculated to yield the following: 5% by weight $Al_2O_3$+2% by weight $Y_2O_3$ with remaining being $Si_3N_4$. The powder was pressed in a steel die to form tiles with dimensions: 4.5×4.5×0.39 inch. The tiles were burned out, and nitrided in a nitrogen mass flow controlled furnace, yielding a reaction bonded silicon nitride tile with a 70% theoretical density. The nitriding yield of all tiles was approximately 99%. The tiles were then trimmed in the nitrided state to dimensions of 3.5×4.0×0.39 inch, i.e. top and bottom of plates were not machined.

Four of the above tiles were cleaned and stacked on top of each other (each tile in contact with closest neighbor) and surrounded with graphite tooling (see FIG. 1).

The tooling with the tiles was placed in a graphite die and hot pressed. Nitrogen gas flow was maintained during the run, and the tiles were hot pressed at 1800° C. (20 minutes hold time at end temperature) with a maximum die pressure of 1750 psi. Heating rate was approximately 5° C./min with the gradual pressure application starting at 1600° C. Upon cooling, the final part was taken out of the tool stack. The original tiles were completely fused together throughout the thickness. Only the outside surface had evidence of two joints in the part. The final dimensions of the hot pressed monolith were 3.5×4.0×1.16 inch (volume: 266 cm³). The final block thickness of 1.16 inch corresponds to a compaction ratio of ~1.4:1. The block was fully dense with a density of 99.7% TD. By X-ray diffraction analysis no other crystalline phase in addition to β-type Si3N4 (β-SiAlON) could be found. Since it was not possible to detect a secondary phase by X-ray diffraction, the binder phase is present predominantly in form of an amorphous, glassy phase.

Figures 2A, 2B:
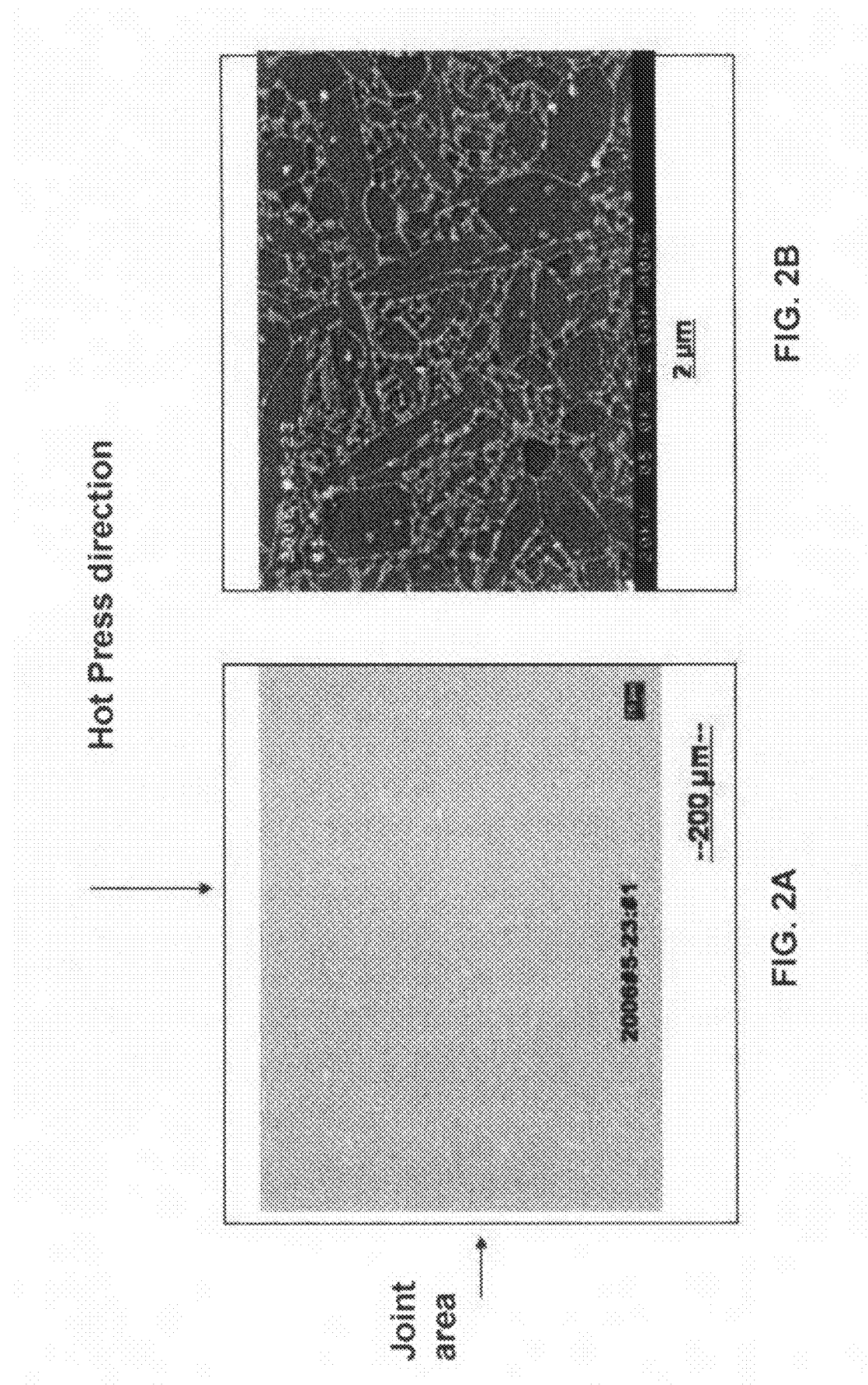
FIGS. 2A and 2B, shows photomicrographs of a sectioned $Si_3N_4$ monolith produced in Example 1, illustrating a joint with its microstructure indistinguishable from the material bulk.

The tile was sectioned to inspect the joints through the thickness, and small gaps were only found close to the edges. After polishing one section of the joint, no evidence of porosity could be observed (see FIGS. 2A and 2B).

Table 1 shows the hardness, fracture toughness and elastic modulus of the monolith in the joint area versus the matrix (base material), showing essentially identical properties.

TABLE 1

| Properties of $Si_3N_4$ monolith of Example 1 | | | |
| --- | --- | --- | --- |
| Area examined | Hardness HV5 (kg/mm²) | Fracture Toughness (MPa · m$^{1/2}$) | Elastic Modulus (GPa) |
| Joint | 1521 ± 33 | 5.2 ± 0.3 | 315 |
| Matrix | 1511 ± 30 | 4.8 ± 0.4 | 315 |

Example 2

Elemental silicon, $Y_2O_3$, $Al_2O_3$ powders were mixed in a slurry with appropriate binders, and the slurry was spray dried to form a flowable and pressable powder. The individual powders had the following specific surface areas: Si—2 m²/g, $Y_2O_3$—8 m²/g and $Al_2O_3$—10 m²/g. The maximum particle size of the Si powder was 20 μm and Si powder purity was ~99% with 0.3% Fe content by weight. The powder composition was calculated to yield the following: 5% by weight $Al_2O_3$+2% by weight $Y_2O_3$ with remaining being $Si_3N_4$. The powder was pressed in a steel die to form tiles with dimensions: 4.5×4.5×0.39 inch. The tiles were burned out, and nitrided in a nitrogen mass flow controlled furnace, yielding a reaction bonded silicon nitride tile with a 70% theoretical density. The nitriding yield of all tiles was approximately 99%. The tiles were then trimmed in the nitrided state to dimensions of 3.5×4.0×0.39 inch.

Figure 3:
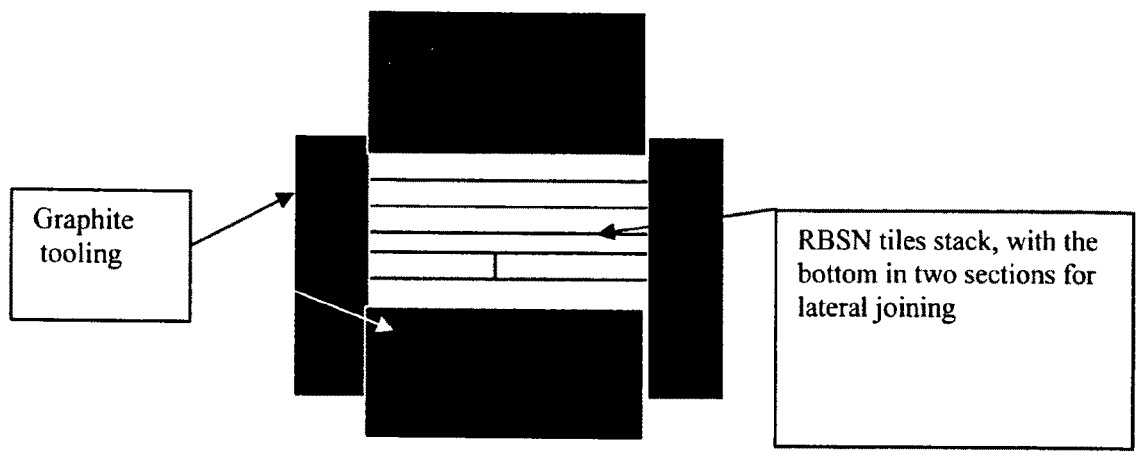
FIG. 3 shows a cross sectional view of a four tile assembly similar to FIG. 1, with the variation that the bottom tile was made up of two sub-tiles to perform not only horizontal bonding of the stacked tiles but also vertical (lateral) bonding of the bottom sub-tiles, where the joining plane is vertical and parallel to the pressing direction.

One of the tiles was cut lengthwise in two parts. Four of the above tiles were cleaned and stacked on top of each other with the bottom consisting of the cut tile, and surrounded with graphite tooling (see FIG. 3). FIG. 3 shows a schematic cross section of a four tile assembly with the bottom tile made up of two sub-tiles designed to perform not only vertical joining (bonding perpendicular to the pressing direction) of the stacked tiles but also lateral joining of the bottom sub-tiles, i.e. bonding parallel to pressing direction.

The tooling with the tiles was placed in a graphite die and hot pressed. Nitrogen gas flow was maintained during the run, and the tiles where hot pressed at 1800° C. (20 mins hold time at end temperature) with a maximum die pressure of 1750 psi. Heating rate was approximately 5° C./min with the gradual pressure application starting at 1600° C. Upon cooling, the final part was taken out of the tool stack. The individual tiles were completely fused together throughout the thickness. Only the outside surface had evidence of two joints in the part. The bottom of the part also fused almost entirely. The part final thickness of 1.16 inch corresponds to a compaction ratio of ~1.4:1. The part density was over 99.5% TD.

The tile was sectioned to inspect the joints through the thickness, and small gaps were only found close to the edges. The bottom of the part showed a minimal gap between the two lateral bonded tiles.

Table 2 shows the hardness, fracture toughness and elastic modulus of the monolith in the joint area versus the matrix (base material), showing essentially identical properties.

TABLE 2

Properties of $Si_3N_4$ monolith of Example 2

| Area examined | Hardness HV-5 (kg/mm$^2$) | Fracture Toughness (MPa·m$^{1/2}$) | Elastic Modulus (GPa) |
| --- | --- | --- | --- |
| Joint | 1509 ± 34 | 4.9 ± 0.3 | 312 |
| Matrix | 1500 ± 33 | 5.0 ± 0.3 | 315 |

Example 3

Elemental silicon, $Y_2O_3$, $Al_2O_3$ powders were mixed in a slurry with appropriate binders, and the slurry was spray dried to form a flow-able and press-able powder. The individual powders had the following specific surface areas: Si—2 m$^2$/g, $Y_2O_3$—8 m$^2$/g and $Al_2O_3$—10 m$^2$/g. The maximum particle size of the Si powder was 20 μm and Si powder purity was ~99% with 0.3% by weight Fe content. The powder composition was calculated to yield the following: 5% by weight $Al_2O_3$+2% by weight $Y_2O_3$ with remaining being $Si_3N_4$. The powder was pressed in a steel die to form tiles with dimensions: 4.5×4.5×0.39 inch. The tiles were burned out, and nitrided in a nitrogen mass flow controlled furnace, yielding a reaction bonded silicon nitride tile with a 70% theoretical density. The nitriding yield of all tiles was approximately 99%. The tiles were then trimmed in the nitrided state to dimensions of 3.5×4.0×0.39 inch.

One of the tiles was cut lengthwise in two tiles. Four of the above tiles were cleaned and stacked on top of each other (each tile in contact with closest neighbor) and surrounded with graphite tooling. The tooling with the tiles was placed in a graphite die and hot pressed. Nitrogen gas flow was maintained during the run, and the tiles where hot pressed at 1850° C. (20 mins hold time at end temperature) with a maximum die pressure of 1750 psi. Heating rate was approximately 5° C./min with the gradual pressure application starting at 1600° C. Upon cooling, the final part was taken out of the tool stack. The individual tiles were completely fused together throughout the thickness. Only the outside surface had evidence of two joints in the part. The bottom of the part also fused almost entirely. The block final thickness was 1.16 inch, the density was 3.202 g/cm$^3$.

The tile was sectioned to inspect the joints through the thickness, and small gaps were only found close to the edges. The bottom of the part showed no gap between the lateral bonded sub-tiles. After polishing one section of the joint, no evidence of porosity could be observed.

These results show that by using a somewhat increased hot pressing temperature (1850° C.) a lateral gap between the bottom sub-tiles can be avoided.

Example 4

Elemental silicon, $Y_2O_3$, $Al_2O_3$ powders were mixed in a slurry with appropriate binders, and the slurry was spray dried to form a flowable and pressable powder. The individual powders had the following specific surface areas: Si—2 m$^2$/g, $Y_2O_3$—8 m$^2$/g and $Al_2O_3$—10 m$^2$/g. The maximum particle size of the Si powder was 20 μm and Si powder purity was ~99% with 0.3% by weight Fe content. The powder composition was calculated to yield the following: 4% by weight $Al_2O_3$+4% by weight $Y_2O_3$ with remaining being $Si_3N_4$. The powder was pressed in a steel die to form tiles with dimensions: 4.5×4.5×0.39 inch. The tiles were burned out, and nitrided in a nitrogen mass flow controlled furnace, yielding a reaction bonded silicon nitride tile with a 68% theoretical density. The nitriding yield of all tiles was approximately 99%. The tiles were then trimmed in the nitrided state to dimensions of 3.5×4.0×0.39 inch, i.e. top and bottom of plates were not machined.

Eight of the above tiles were cleaned and stacked on top of each other and surrounded with graphite tooling. The tooling with the tiles was placed in a graphite die and hot pressed. Nitrogen gas flow was maintained during the run, and the tiles where hot pressed at 1850° C. (20 mins hold time at end temperature) with a maximum die pressure of 1750 psi. Heating rate was approximately 5° C./min with the gradual pressure application starting at 1600° C. Upon cooling, the final part was taken out of the tool stack. The individual tiles were completely fused together throughout the thickness. Only the outside surface had evidence of two joints in the part. The final dimensions of the hot pressed monolith were 3.5×4.0×2.25 inch (volume: 516 cm$^3$). The block final thickness of 2.25 inch corresponds to a compaction ratio of ~1.4:1. The block was fully dense with a density of 99.5% TD.

The tile was sectioned to inspect the joints through the thickness, and small gaps were only found close to the edges. After polishing one section of the joint, no evidence of porosity could be observed.

Figure 4:
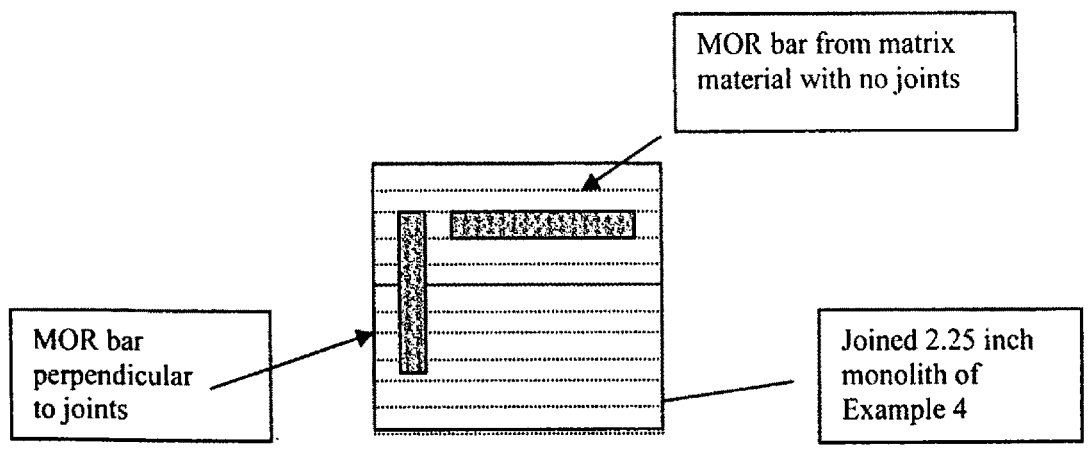
FIG. 4 is a cross sectional view of a $Si_3N_4$ monolith produced in Example 4 showing orientation of flexural strength test bars (MOR bars) for measurement of joint strength and matrix strength, respectively.

Ten MOR bars (ASTM C1161 size) were machined from the part with the length of the bar cut from the thickness of the tile, i.e. perpendicular to the joints (see FIG. 4), and the material strength was measured. No significant variation of joint strengths existed within the monolith with and without the bond areas.

Table 3 shows the hardness, fracture toughness and flexural strength of the monolith in the joint area versus the matrix (base material), showing essentially identical properties.

TABLE 3

Properties of Si₃N₄ monolith of Example 4

| Area examined | Hardness HV-5 (kg/mm$^2$) | Fracture Toughness (MPa·m$^{1/2}$) | Flexural strength (MPa) |
|---|---|---|---|
| Perpendicular to joints | 1505 ± 32 | 5.1 ± 0.3 | 740 |
| Parallel to joints - bulk matrix strength | 1501 ± 34 | 5.0 ± 0.3 | 730 |

Example 5

Elemental silicon, $Y_2O_3$, $Al_2O_3$ powders were mixed in a slurry with appropriate binders, and the slurry was spray dried to form a flowable and pressable powder. The individual powders had the following specific surface areas: Si—2 m$^2$/g, $Y_2O_3$—8 m$^2$/g and $Al_2O_3$—10 m$^2$/g. The maximum particle size of the Si powder was 20 µm and Si powder purity was ~99% with 0.3% by weight Fe content. The powder composition was calculated to yield the following: 5% by weight $Al_2O_3$+2% by weight $Y_2O_3$ with remaining being $Si_3N_4$. The powder was pressed in a steel die to form tiles with dimensions: 4.5×4.5×0.39 inch. The tiles were burned out, and nitrided in a nitrogen mass flow controlled furnace, yielding a reaction bonded silicon nitride tile with a 68% theoretical density. The nitriding yield of all tiles was approximately 99%. The tiles were then trimmed in the nitrided state to dimensions of 3.5×4.0×0.39 inch.

Sixteen of the above tiles were cleaned and stacked on top of each other and surrounded with graphite tooling. The tooling with the tiles was placed in a graphite die and hot pressed. Nitrogen gas flow was maintained during the run, and the tiles were hot pressed at 1850° C. (20 mins hold time at end temperature) with a maximum die pressure of 1750 psi. Heating rate was approximately 5° C./min with the gradual pressure application starting at 1600° C. Upon cooling, the final part was taken out of the tool stack. The individual tiles were completely fused together throughout the thickness. Only the outside surface had evidence of two joints in the part. The final dimensions of the hot pressed monolith were 3.5×4.0×4.16 inch (volume: 954 cm$^3$). The block final thickness of 4.16 inch corresponds to a compaction ratio of ~1.4:1. The block was fully dense with a density of 99.6% TD.

The block was sectioned to inspect the joints through the thickness, and shallow gaps were only found close to the edges. After polishing one section of the joint, no evidence of porosity could be observed.

Ten MOR bars (ASTM C1161 size) were machined from the part with the length of the bar cut from the thickness of the tile, i.e. perpendicular to the joints, the material strength and Weibull modulus was measured the results given in Table 4.

Again, no variation of joint strength existed within the monolith, i.e. from the outer surface to the center of the block.

TABLE 4

Properties of Si₃N₄ monolith of Example 5

| Area examined | Flexural strength (MPa) | Weibull modulus |
|---|---|---|
| Joint | 840 | 14 |

Example 6

Elemental silicon and $MgSiO_3$ powders were mixed in a slurry with appropriate binders, and the slurry was spray dried to form a flowable and pressable powder. The individual powders had the following specific surface areas: Si—2 m$^2$/g, $MgSiO_3$—10 m$^2$/g. The maximum particle size of the Si powder was 20 µm and Si powder purity was ~99% with 0.3% by weight Fe content. The powder composition was calculated to yield the following: 2% by weight $MgSiO_3$ with remaining being $Si_3N_4$. The powder was pressed in a steel die to form tiles with dimensions: 4.5×4.5×0.39 inch. The tiles were burned out, and nitrided in a nitrogen mass flow controlled furnace, yielding a reaction bonded silicon nitride tile with a 67% theoretical density. The nitriding yield of all tiles was approximately 99%. The tiles were then trimmed in the nitrided state to dimensions of 3.5×4.0×0.39 inch, i.e. top and bottom of plates were not machined.

Four of the above tiles were cleaned and stacked on top of each other (each tile in contact with closest neighbor) and surrounded with graphite tooling (see FIG. 1).

The tooling with the tiles was placed in a graphite die and hot pressed. Nitrogen gas flow was maintained during the run, and the tiles were hot pressed at 1800° C. (20 mins hold time at end temperature) with a maximum die pressure of 1750 psi. Heating rate was approximately 5° C./min with the gradual pressure application starting at 1600° C. Upon cooling, the final part was taken out of the tool stack.

The individual tiles were completely fused together throughout the thickness, with some decomposition visible on the edges. Only the outside surface had evidence of two joints in the part. The final dimensions of the hot pressed monolith were 3.5×4.0×1.1 inch. The part final thickness of 1.1 inch corresponds to a compaction ratio of ~1.4:1. The part was fully dense with a density of 99.6% TD.

X-ray diffraction analysis showed no other crystalline phase in addition to β-type $Si_3N_4$ (or β-SiAlON). Since it was not possible to detect a secondary phase by X-ray diffraction, the binder phase is present predominantly in form of an amorphous, glassy phase.

The tile was sectioned to inspect the joints through the thickness, and small gaps were only found close to the edges. After polishing one section of the joint, no evidence of porosity could be observed.

Table 5 shows the hardness and fracture toughness of the monolith in the joint area versus the matrix (base material), showing essentially identical properties.

TABLE 5

Properties of Si₃N₄ monolith of Example 6

| Area examined | Hardness HV-5 (kg/mm$^2$) | Fracture Toughness (MPa·m$^{1/2}$) |
|---|---|---|
| Perpendicular to joints | 1575 ± 30 | 4.9 ± 0.2 |
| Parallel to joints - bulk matrix strength | 1550 ± 31 | 5.0 ± 0.3 |

Example 7

Elemental silicon, YAG ($Y_3Al_5O_{12}$), and $Al_2O_3$ powders were mixed in a slurry with appropriate binders, and the slurry was spray dried to form a flowable and pressable powder. The individual powders had the following specific surface areas: Si—2 m²/g, YAG—7 m²/g and $Al_2O_3$—10 m²/g. The maximum particle size of the Si powder was 20 μm and Si powder purity was ~99% with 0.3% by weight Fe content. The powder composition was calculated to yield the following: 3.6% by weight YAG+3.4% by weight $Al_2O_3$ with remaining being $Si_3N_4$. The powder was pressed in a steel die to form cylindrical, thick walled rings with dimensions: 7.0 inch outer diameter, 1.0 inch inner diameter and 0.39 inch length. The rings were burned out, and nitrided in a nitrogen mass flow controlled furnace, yielding reaction bonded silicon nitride rings with a 68% theoretical density. The nitriding yield of all rings was approximately 99%.

Sixteen of the above rings were cleaned and stacked on top of each other and surrounded with graphite tooling. Alignment of stacked rings in the column was provided by use of a graphite center core-rod, which later forms the inner diameter of the hot pressed tube. All graphite surfaces adjacent to RBSN rings were coated with a BN layer, which acts as a parting agent.

The graphite stack with the rings and the graphite center rod were placed in a graphite die and hot pressed. Nitrogen gas flow was maintained during the run, and the tiles where hot pressed at 1850° C. (20 mins hold time at end temperature) with a maximum die pressure of 1750 psi. Heating rate was approximately 5° C./min with the gradual pressure application starting at 1600° C. Upon cooling, the final part (tube) was taken out of the tool stack. The individual rings were completely fused together throughout the thickness. Only the outside surface had evidence of two joints in the tube. The final dimensions of the hot pressed tube were 7.0 inch outer diameter, 1.0 inch inner diameter and 4.16 inch length (volume: 2570 cm³). The tube final length of 4.16 inch corresponds to a compaction ratio of ~1.4:1. The tube was fully dense with a density of 99.6% TD.

The tube was sectioned in the axial direction parallel to the pressing direction, and after polishing one section of the joint, no evidence of porosity could be observed. Ten MOR bars (ASTM C1161 size) were machined from the tube with the length of the bar cut from the length of the tube, i.e. perpendicular to the joints. The material strength and Weibull modulus was measured the results given in Table 6. Again, no significant variation of joint strengths existed within the monolith.

TABLE 6

Properties of $Si_3N_4$ monolith tubular body of Example 7

| Area examined | Flexural strength (MPa) | Weibull modulus |
|---|---|---|
| Joint | 820 | 15 |

Example 8

Elemental silicon, $Y_2O_3$, $Al_2O_3$ powders were mixed in a slurry with appropriate binders, and the slurry was spray dried to form a flowable and pressable powder. The individual powders had the following specific surface areas: Si—2 m²/g, $Y_2O_3$—8 m²/g and $Al_2O_3$—10 m²/g. The maximum particle size of the Si powder was 20 μm and Si powder purity was ~99% with 0.3% by weight Fe content. The powder composition was calculated to yield the following: 2% by weight $Al_2O_3$+8% by weight $Y_2O_3$ with remaining being $Si_3N_4$. The powder was pressed in a steel die to form tiles with dimensions: 4.5×4.5×0.39 inch. The tiles were burned out, and nitrided in a nitrogen mass flow controlled furnace, yielding a reaction bonded silicon nitride tile with a 68% theoretical density. The nitriding yield of all tiles was approximately 99%. The tiles were then trimmed in the nitrided state to dimensions of 3.5×4.0×0.39 inch, i.e. top and bottom of plates were not machined.

Eight of the above tiles were cleaned and stacked on top of each other and surrounded with graphite tooling. The tooling with the tiles was placed in a graphite die and hot pressed. Nitrogen gas flow was maintained during the run, and the tiles where hot pressed at 1850° C. (20 mins hold time at end temperature) with a maximum die pressure of 1750 psi. Heating rate was approximately 5° C./min with the gradual pressure application starting at 1600° C. Upon cooling, the final part was taken out of the tool stack. The individual tiles were completely fused together throughout the thickness. Only the outside surface had evidence of two joints in the part. The final dimensions of the hot pressed monolith were 3.5×4.0× 2.15 inch (volume: 516 cm³). The block final thickness of 2.1" corresponding to a compaction ratio of about 1.4:1. The block was fully dense with a density of 99.5% TD.

The tile was sectioned to inspect the joints through the thickness, and small gaps were only found close to the edges. After polishing one section of the joint, no evidence of porosity could be observed. The strength of the joint and bulk material (Table 7) show essentially the same strength of bonded areas as the bulk.

XRD of the material from example 8 in addition to $\beta$-$Si_3N_4$ phase showed a single peak from minor presence of an additional crystalline phase that could not be positively identified. An additional sample from same part sample was subjected to a thermal treatment (1400° C. for 4 hours) and XRD of this sample showed, in addition to $\beta$-$Si_3N_4$, pronounced peaks that was identified as $Y_4Si_2N_2O_7$ phase, and whose most intense peak was also present in the as-hot pressed sample. The intensity of the 100% peak of the $Y_4Si_2N_2O_7$ phase increased by a factor of 3 after the heat treatment. This experiment demonstrates that in the as-hot pressed sample, the binder phase is predominantly amorphous in example 8, and that it can be crystallized in a separate post-hot pressing heat treatment.

TABLE 7

Properties of $Si_3N_4$ monolith of Example 8

| Area examined | Strength (MPa) | Fracture Toughness (MPa·m^(1/2)) |
|---|---|---|
| Perpendicular to joints | 750 | 4.7 ± 0.2 |
| Parallel to joints - bulk matrix strength | 758 | 4.7 ± 0.3 |

Example 9

Elemental silicon, $Y_2O_3$, and MgO powders were mixed in a slurry with appropriate binders, and the slurry was spray dried to form a flowable and pressable powder. The individual powders had the following specific surface areas: Si—2 m²/g, $Y_2O_3$—8 m²/g and MgO—9 m²/g. The maximum particle size of the Si powder was 20 μm and Si powder purity was ~99% with 0.3% by weight Fe content. The powder composition was calculated to yield the following: 2% by weight MgO+3% by weight $Y_2O_3$ with remaining being $Si_3N_4$. The powder was pressed in a steel die to form tiles with dimensions: 4.5×4.5×0.39 inch. The tiles were burned out, and nitrided in a nitrogen mass flow controlled furnace, yielding a reaction bonded silicon nitride tile with a 68% theoretical density, the nitriding yield of all tiles was approximately 99%. The tiles were then trimmed in the nitrided state to dimensions of 3.5×4.0×0.39 inch, i.e. top and bottom of plates were not machined.

Eight of the above tiles were cleaned and stacked on top of each other and surrounded with graphite tooling. The tooling with the tiles was placed in a graphite die and hot pressed. Nitrogen gas flow was maintained during the run, and the tiles where hot pressed at 1800° C. (20 mins hold time at end temperature) with a maximum die pressure of 1750 psi. Heating rate was approximately 5° C./min with the gradual pressure application starting at 1600° C. Upon cooling, the final part was taken out of the tool stack. The individual tiles were completely fused together throughout the thickness. Only the outside surface had evidence of two joints in the part. The final dimensions of the hot pressed monolith were 3.5×4.0×2.20 inch (volume: 516 cm$^3$). The block final thickness of 2.1" corresponding to a compaction ratio of about 1.4:1. The block was fully dense with a density of 99.6% TD.

The tile was sectioned to inspect the joints through the thickness, and small gaps were only found close to the edges. After polishing one section of the joint, no evidence of porosity could be observed. The strength of the joint and bulk material (Table 8) show essentially the same strengths of bonded areas as the bulk. Thermal conductivity of silicon nitride monolith of example 9 was higher than of others due to absence of $Al_2O_3$. XRD of the material from example 9 showed only β-$Si_3N_4$ phase presence.

TABLE 8

Properties of $Si_3N_4$ monolith of Example 8

| Area examined | Strength (MPa) | Thermal conductivity (W/m K) |
|---|---|---|
| Perpendicular to joints | 730 | 40 |
| Parallel to joints - bulk matrix strength | 720 | 30 |

It should be noted that further optimisation of run parameters would further increase the thermal conductivity of composition in example 9.

Comparison Example 10

This example was conducted to illustrate the effects of conventional powder hot pressing on the density and strength properties of a hot pressed $Si_3N_4$ body having final dimensions similar to the monolith described in example 5.

Submicron particle sized $Si_3N_4$ powder, $Y_2O_3$ and $Al_2O_3$ powders were mixed in a slurry without pressing aids, and the slurry was spray dried to form a flowable and pressable powder with a loose powder density of 0.97 g/cm$^3$. The individual powders had the following specific surface areas: $Si_3N_4$—12 m$^2$/g, $Y_2O_3$—8 m$^2$/g and $Al_2O_3$ 10 m$^2$/g. The maximum particle size of the $Si_3N_4$ powder was 2 μm and $Si_3N_4$ powder purity was ~99.5%. The powder composition was calculated to yield the following: 5% by weight $Al_2O_3$+2% by weight $Y_2O_3$ with remaining being $Si_3N_4$.

A predetermined quantity of the spray dried powder mixture (to achieve 100% TD density) was poured into a graphite die having a cavity of dimensions 3.5 inch×4.0 inch×15.0 inch and hot pressed in a nitrogen atmosphere with the maximum temperatures and pressures being 1850° C. and 3000 psi. Heating rate was approximately 5° C./min with the gradual pressure application starting at 1600° C.

The final dimensions of the powder hot pressed body were 3.5×4.0×4.21 inch. The part final thickness of 4.21 inch corresponds to a high compaction ratio of ~3.3:1. The part showed a bulk density of only 99.0% TD. However, the powder hot pressed block was near theoretical density in an outer rim-zone around the edges but of only <99% density in an interior core-zone. Edge cracks were observed in several places around corners. When the part was sliced, significant color variation was observed through the thickness, the center being dark and the surface lighter.

Strength test bars were cut from these different zones with the length of the bar parallel to the hot pressing direction. Material strength and bulk density of different bars were measured, the results given in Table 9.

TABLE 9

Properties of powder-hot-pressed-body of Example 8

| Area examined | Hot pressed Density (% TD) | Flexural strength (MPa) |
|---|---|---|
| Rim | 99.9 | 830 |
| Core | 97.0 | 650 |

Thus, only the material of the rim zone (thickness ~1 inch) approached the properties of the monolith produced according to the present invention (compare with Example 5). This example shows that the method according to the invention produces a much more uniform densification result than the conventional powder hot pressing process in respect to high volume shapes.

Also the post-sintering process of doped RBSN (leading to so called SRBSN material) with a gas-pressure cycle (instead of uniaxial hot pressing) cannot be applied to a body of larger dimensions because of the problem of obtaining in-depth nitridation for RBSN parts with a thickness of greater ~2 inch.

From the given examples 1-9 it is clear that this method can be tailored by changing the final hot pressing temperature and die pressure to accommodate different $Si_3N_4$ material compositions with varied densification aids, including rare earth oxides, alumina, magnesium silicates and oxides, yttrium aluminates and others. Also densification aid additions can be made after nitridation, by impregnating the RBSN bodies with appropriate sintering aids. The amount of the vertical shrinkage can be controlled by controlling the bulk density of RBSN, and the shrinkage can be significantly reduced (by a factor of ~3) compared to what is normally experienced when submicron $Si_3N_4$ powder is hot pressed.

I claim:

1. A fully dense multi-component $Si_3N_4$ monolith having a matrix and indistinguishable joints made by simultaneously joining and hot pressing a plurality of RBSN parts, said $Si_3N_4$ monolith comprising at least 85% by weight β-$Si_3N_4$ and up to 15% by weight of a predominantly amorphous binder phase and having a hot pressed volume of greater than 250 cm$^3$ and the following properties both in the joints and in the matrix material:
   (a) bulk density of at least 99.0% of theoretical;
   (b) fracture toughness of at least 4.5 MPa·m$^{1/2}$;
   (c) Vickers hardness HV-5 greater than 1500 kg/mm$^2$;
   (d) elastic modulus of at least 300 GPa; and
   (e) four-point flexural strength of at least 700 MPa.

2. The fully dense $Si_3N_4$ monolith of claim 1 wherein said binder phase is selected from the systems rare earth metal—Al—Si—O—N, rare earth metal—Mg—Si—O—N, and Mg—Si—O—N.

3. The fully dense $Si_3N_4$ monolith of claim 1 wherein said RBSN parts have a bulk density in the range 45-75% TD and its $Si_3N_4$ content consist of at least 60% by weight of $\alpha$-$Si_3N_4$, and the remainder densification aids added before nitriding selected from the group consisting of magnesium silicate ($MgSiO_3$ or $Mg_2SiO_4$), magnesium oxide, a member of the group of rare earth oxides or rare earth aluminates, aluminium nitride and aluminium oxide or a mixture thereof.

4. The fully dense $Si_3N_4$ monolith of claim 1, which is a large-sized block, tile, lining, tube or ring.

5. A fully dense $Si_3N_4$ monolith produced as a large-sized refractory component by the method comprising the steps of:
(a) forming a plurality of green bodies from a powder mixture having elemental silicon and 0.5-10% by weight of a densification aid selected from the group consisting of magnesium silicate ($MgSiO_3$ or $Mg_2SiO_4$), magnesium oxide, a member of the group of rare earth oxides or rare earth aluminates, aluminium nitride and aluminium oxide or a mixture thereof; said powder mixture of elemental silicon and densification aid containing up to 0.5% by weight iron;
(b) nitriding said green bodies in a nitrogen containing atmosphere to provide full conversion of elemental silicon to $Si_3N_4$; and formed RBSN bodies with a bulk density of 60-70% TD having silicon nitride and 0.5-10% by weight densification aid with the total amount of $\alpha$-$Si_3N_4$ to be at least 60%;
(c) placing individual RBSN bodies in contact with each other to define an assembly of RBSN bodies according to a predetermined shape;
(d) placing said assembly into a graphite die;
(e) placing said die with said assembly in a uniaxial hot press;
(f) conducting a hot pressing procedure on said assembly under controlled conditions of temperature, die-pressure and atmosphere until the assembled RBSN parts are joined to a fully dense $Si_3N_4$ monolith consisting of at least 90% by weight of $\beta$-$Si_3N_4$ and up to 10% by weight of a predominantly amorphous binder phase.

* * * * *